INVENTOR
WILLIAM HALKO
Ernest E Carver
ATTORNEY

Dec. 23, 1947.    W. HALKO    2,433,118
DAILY AND WEEKLY TIME RECORDER
Filed Aug. 11, 1944    4 Sheets-Sheet 2

INVENTOR
WILLIAM HALKO
Ernest E Carver
ATTORNEY

INVENTOR
WILLIAM HALKO
Ernest E Carver
ATTORNEY.

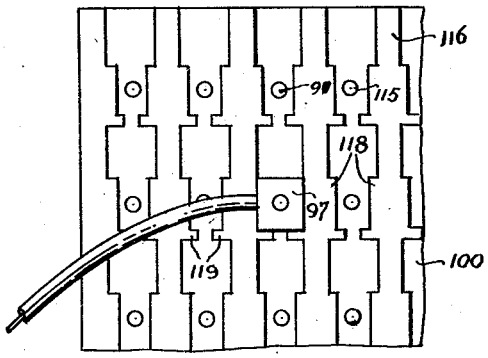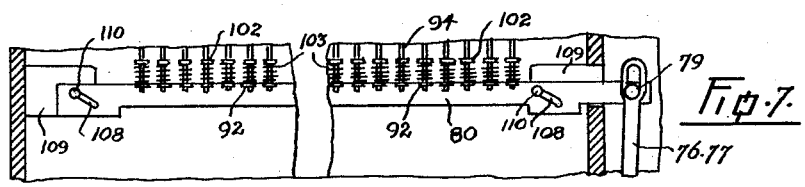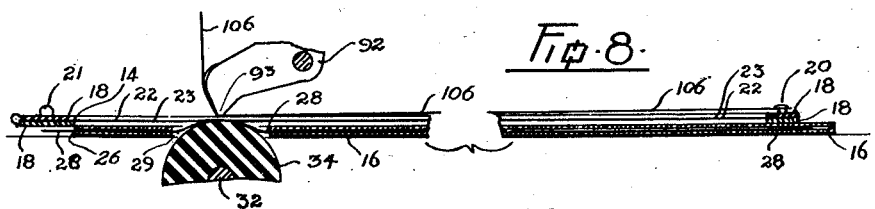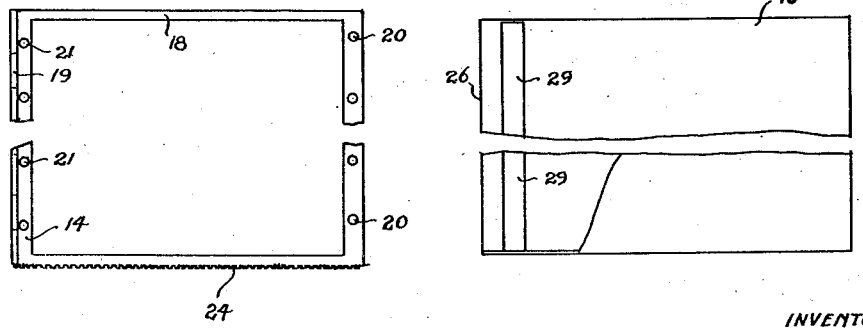

Patented Dec. 23, 1947

2,433,118

UNITED STATES PATENT OFFICE 2,433,118

DAILY AND WEEKLY TIME RECORDER

William Halko, Vancouver, British Columbia, Canada

Application August 11, 1944, Serial No. 549,011

3 Claims. (Cl. 234—41)

My invention relates to improvements in time recorders. The objects of the invention are to provide a means of indicating the presence of individual employees at their respective posts in a department of a store or factory, or their location, if absent; to provide means for recording the time of each individual employee during which he is at his appointed post, to record said time simultaneously on two record sheets, one covering a day and a second covering more than one day. A further object is to expose to view that portion of the day sheet which bears the time record of the employees and to provide an indicator to show where an employee may be found if he is away from his appointed post.

Referring to the drawings:

Fig. 6 is a plan view of the underside of the peg plate.

Fig. 7 is a detail plan view showing the marker locking bar.

Fig. 8 is an enlarged longitudinal section showing the record sheet containers and the point of contact of a marker.

Fig. 9 is a plan view of the daily sheet container.

Fig. 10 is a plan view of the weekly sheet container.

In the drawings like characters of reference indicate corresponding parts in each figure.

Figure 1:
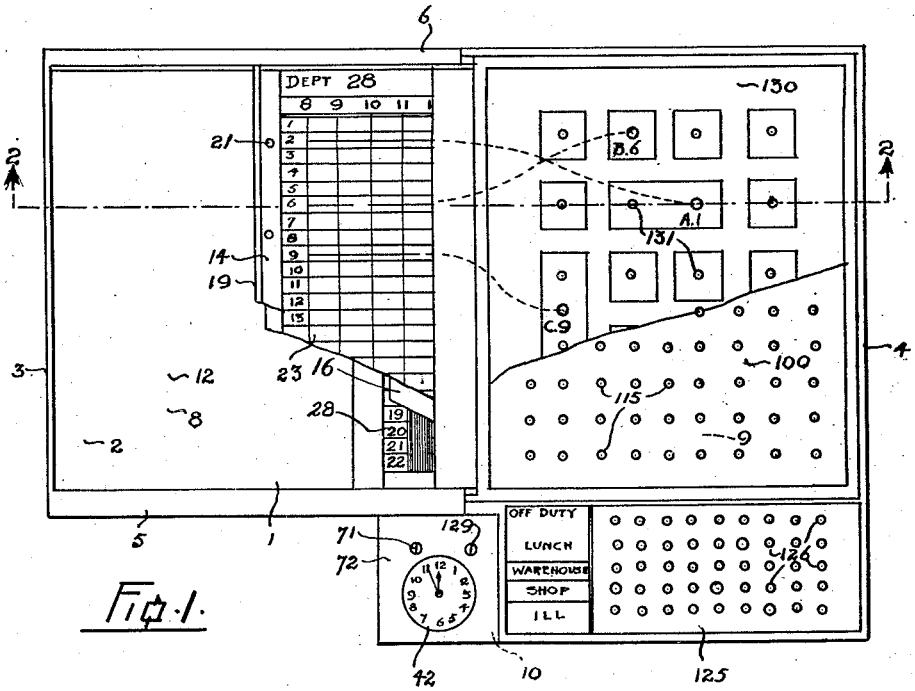
Fig. 1 is a front view of the invention.

The numeral 1 indicates generally a cabinet having a back panel or wall 2, side walls 3, 4, 5 and 6. The cabinet is divided into compartments 8, 9 and 10. The compartment 8 receives the recording sheets and exposes that portion of the daily sheet upon which time has been recorded, the compartment 9 receives the sheets prior to recording and encloses the operating means for each of the markers and the compartment 10 encloses the time clock and sheet operating means. A false partition 12, see Figures 1 and 2, covers the area of the compartments 8 and 9 and is provided with suitable openings therein, not specifically indicated, for the projection of operating parts.

Two record sheet containers generally indicated by the numerals 14 and 16 respectively are adapted for insertion into the compartment 8 and and also into the compartment 9. The sheet container 14, see Figures 8 and 9, which will be referred to as the daily sheet container, consists of a pair of light mated frames 18 hingedly connected together as at 19, the upper of said frames being provided with studs 20 for engaging the free end of an inked sheet or ribbon 106 to be hereinafter described. The open end of the container is provided with appropriate means such as the pins 21 for holding a sheet of carbon paper 22 and a daily record sheet 23. These two sheets are of slightly less width than the width of opening of the frames 18 and are of such length as to be engaged at both ends of the frames 18. Along one edge of the upper frame 18 is a toothed rack 24 by which the sheet container 14 is moved outwardly from the compartment 9 to the compartment 8, where it was first inserted.

The sheet container 16 consists of a rectangular metal envelope open at one end as at 26 to admit the weekly record sheet 28. Adjacent its open end is a slot 29 extending through both sides of the envelope which is as wide as the record sheet 28, so that the sheet may be pressed up through said slot into engaging contact with the backing or carbon sheet 22 under the daily sheet 23.

Mounted in bearings 30 in the base of the compartments 9 and 10 is a forked frame 31, see Figures 2, 3, 4 and 5, which journals a shaft 32 fitted with a rubber roller 34 and a worm gear 35. The frame 31 is resiliently held in horizontal position by one or more compression springs 37 so that the upper periphery of the roller will bear against the weekly record sheet 28 as shown in Figure 8 when in normal operation. The free ends of the frame 31 are provided with lugs 38 which normally rest upon a sliding bar 39 having two side gaps 40 through which the lugs 38 may pass when the bar is moved from its normal position. This bar forms a rigid support for the roller when said roller is in normal operating position as shown, but allows said roller to be lowered when it is desired to insert or withdraw the weekly sheet container 16. The roller is driven from a longitudinal drive shaft 41 which is continuously driven from a time clock indicated only in Figures 1 and 3 by the numeral 42. The driving train to the roller is as follows: The drive shaft is fitted with a worm 43 which drives a worm wheel 44 on a horizontal shaft 45, the shaft being fitted adjacent its rear end with a worm 47 which drives the gear 35 of the roller shaft 32. The horizontal shaft 45 is provided with a gear wheel 50 which meshes with a gear 51 which is freely mounted upon a shaft 52 which is splined adjacent its forward end as at 53. A clutch 55 is fitted upon the shaft 52, the forward half of the clutch being slidably and non-rotatably mounted upon the splines 53 and the rear half being connected to the gear 51 so that the shaft 52 is rotated from the gear 51 when the clutch is engaged and remains at rest when the clutch is disengaged. The rear end of the shaft 52 is fitted with a gear 57 which is adapted to engage the rack 24 of the daily record sheet container 14 to move it and the sheet 23 held therein lengthwise of the compartment 8 as elapsed time is recorded upon its record sheet. A spring 58 having a fork at one end engages a slot 59 in the forward half of the clutch 55 and normally holds the clutch engaged. A horizontal shaft 62 is provided with a face cam 63 which is adapted to project to the rear of the spring 58 as the shaft 62 is turned in a clockwise direction to disengage the clutch and leave the gear 57 free to rotate to facilitate the insertion or removal of the daily sheet container 14 from the compartment 8.

The shaft 62 is fitted at its rear end with a peripheral face cam 64 and engages a spring loaded bell crank 66, one leg of the bell crank being slotted as at 67 and connected thereby to the bar 39 by a pin 68. The shaft 62 is fitted with a slotted head 69 which is aligned with a similar slot 71 formed in a cover 72 surrounding the clock dial. The head 69 is adapted to be turned by a removable key, not shown. The front end of the shaft 62 is provided with a cam 74 which bears upon the leg 75 of a spring tensioned bell crank 76, the leg 77 of said bell crank being connected by a pin 79 to a bar 80, see detail in Figure 7, the purpose of which will hereinafter appear.

Figure 2:
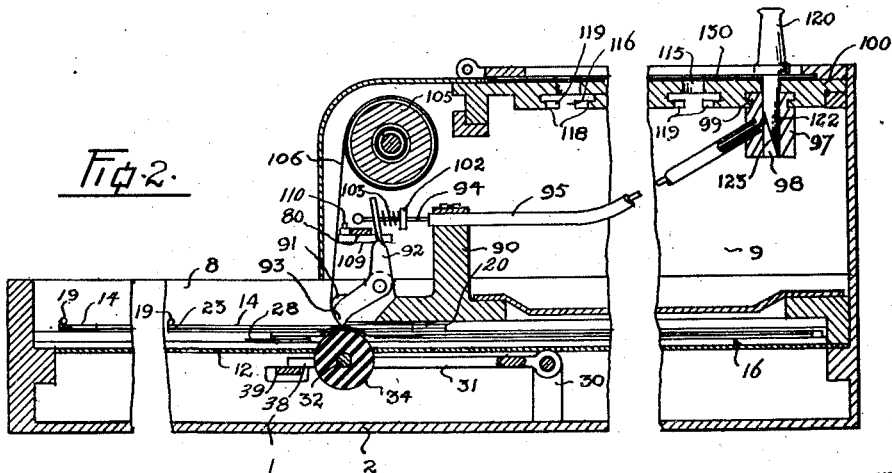
Fig. 2 is an enlarged sectional view taken on the line 2—2 of Figure 1.
Figure 1A:
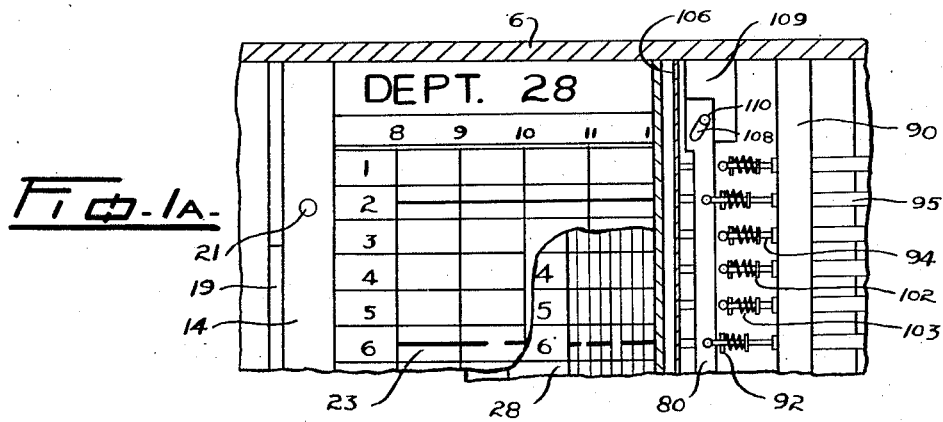
Fig. 1A is an enlarged detail plan view showing typical disposition of record sheets.
Figure 11:
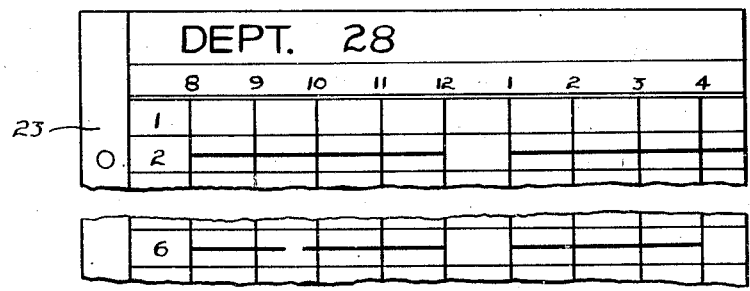
Figs. 11 and 12 are respectively part plan views of a day record sheet and a weekly record sheet.
Figure 12:
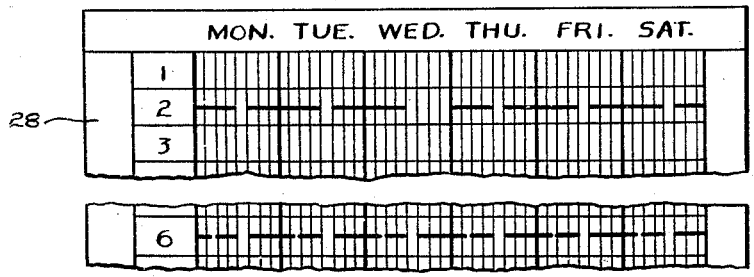

Extending between the compartments 8 and 9 and above the roller 34 is an inverted T-shaped member 90 having a rounded front edge 91 which is slotted to rockingly mount a plurality of markers 92, one for each person whose time is to be recorded on the record sheets 23 and 28. These markers are each in the form of a bell crank having a stylus point 93 and having its other arm apertured to receive a push wire 94. The push wires 94 are each in a flexible tube 95, one end of which is secured to the T-shaped member and its opposite end to a head 97. Each head 97 has a vertical bore 98 into which an end of a push wire 94 projects, as shown in Figure 2. The head is grooved on opposite sides as at 99 for purposes of removable attachment to a removable plate 100 which will be described later. Secured about the marker end of the push wire is a collar 102 and interposed between the collar and the marker is a coil spring 103 of sufficient strength to hold the stylus 93 projected below the bottom of the T-shaped member to inscribe a line on the sheets within the containers 14 and 16.

Mounted above the markers 92 is a spring wound roller 105 fitted with an inked sheet 106 similar to a typewriter ribbon but of a width to cover the width of all the markers. The free end of this sheet is attached to the studs 20 of the container 14, so that when a container and its sheet is moved into the compartment 9 under the markers any of said markers which are set in actuating position will indent the inked sheet 106 and will develop a marking pressure through the daily record sheet 23, the carbon paper 22 below it and onto the weekly record sheet 28 at that point where the record sheets are supported by the roller 34.

The sliding bar 80 is mounted parallel to the member 90 immediately to the rear of the push wires 94, and serves to lift the markers out of marking engagement with the sheet 23 through the inked sheet 106. The bar is provided with inclined slots 108 and rides on bearing blocks 109, which are fitted with pins 110 which pass through the slots, so that when the bar is moved to the left of Figure 7 in response to rotation of the shaft 62 and the rocking of the bell crank 76 the bar engages all the markers whose stylus points 93 are down, compressing the coil springs 103 and raising the stylus points so that no further marking of any sheet may take place should it be necessary to withdraw record sheets or install others in place.

The plate 100 is removable and preferably hinged see Fig. 2 to afford access to its rear face, see Figure 6. It is provided with regularly spaced apertures 115 which are close enough to register appropriately with a desired location of any plan of a department or shop which it is desired to mount above it. The rear of the plate is provided with channels 116 provided intermediate their length with overhanging ledges 118, see Figure 2, terminating with stops 119 at one end. Each pair of ledges is adapted to engage the grooves 99 of a head 97 and the adjacent stops hold it in position with its bore 98 in alignment with an aperture 115.

Each employee is provided with an identification peg 120 consisting of a knob bearing a suitable number or other identification, not shown, and a round stem 122 which is splayed off at its lower end as at 123. The peg on being inserted into its proper aperture and head 97, imparts endwise movement to the push wire 94 and through its spring 103 depresses the stylus point of its connected marker 93.

A cover 125 is provided over the compartment 10 which is provided with apertures 126 arranged in rows and at the left of the rows indicia are provided such as "Off duty," "Lunch," "Warehouse," etc., so that any employee who is away from his appointed post, such as being absent for lunch, will place his identification peg in an aperture aligned with the word "Lunch" so that his overseer on looking at the device will be informed as to his whereabouts.

Overlying the plate 100 is a chart or plan 130 preferably of the counters or locations of staff in the shop or department where the record is to be kept. This chart would preferably be drawn on a card incised or cut to provide knockouts capable of registration with any of the apertures 115 of the plate.

Appropriate knockouts would be removed from the chart 130 to provide apertures 131 to show the places in the area represented at which employees may be found, so that identification pegs 120 could be inserted in their appropriate places. For instance, employees A, B and C would be given identification pegs A1, A6 and A9. A's position in the department would be marked say A.1, B's position would be marked B.6 and C's position marked C.9 and a push wire 94 would be arranged leading from the marker 92 aligned with each employee's number on the daily record sheet 23 with the aperture 131 adjacent his indicated position on the chart 130 as indicated in dotted line in Figure 1. As these employees insert their identification pegs 120 into their assigned apertures 131, they will depress the stylus point corresponding to their number on the daily record sheet 23, so that a line is drawn on said sheet corresponding in length to the time they have severally remained at their posts.

In the example shown, the line adjacent the number 2 on sheet 23 in Fig. 1 shows that employee A has worked from 8 to 12; the line adjacent number 6 shows that B has worked from 8 to 9:30 and from 9:45 to 12, and the line adjacent number 9 shows that C has worked from 8 to 11:30 and from 11:45 to 12. During the time of B's absence his identification peg was withdrawn and placed in appropriate position in the cover 126. C's peg was likewise withdrawn between 11:30 and 11:45.

In the embodiment shown, the gearing of the driving mechanism is such as to drive the daily sheet six times as fast as the weekly sheet, so that six consecutive daily sheets can be compiled in detail during each week and the entire record of the six sheets will be applied to one separate weekly sheet which remains in its container 16 throughout the week.

In operation the gear wheel 57 drives the container 14 and the daily sheet moving with it under the stylus points causes said points to inscribe lines on said sheet. As the container 14 is moved outwardly by the mechanical drive, the inked sheet 106 is rolled back onto the roller 105. The weekly sheet 28 is driven by the roller 34 and receives its imprint from the stylus points 93 through the daily sheet.

When it is desired to remove one daily sheet and install another, the shaft 62 is turned in a clockwise direction by a key inserted in slot 71, previously described, to lift all the stylus points, to disengage the clutch 55 and free the gear 57 and release the lugs 38 of the forked roller frame 31 from the bar 39, when the container 14 and its contents can be removed without discontinuing the movement of the weekly sheet which is still engaged by the roller 34.

Figure 3:
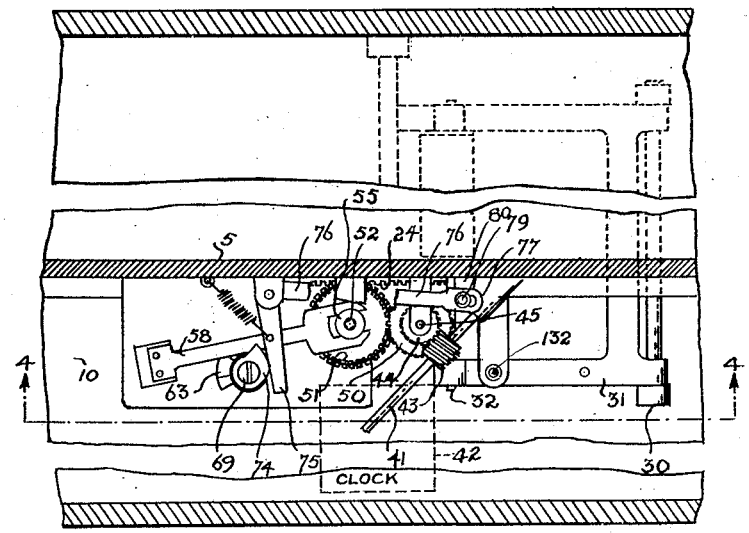
Fig. 3 is an enlarged plan view showing the driving train for the recording sheets.
Figure 4:
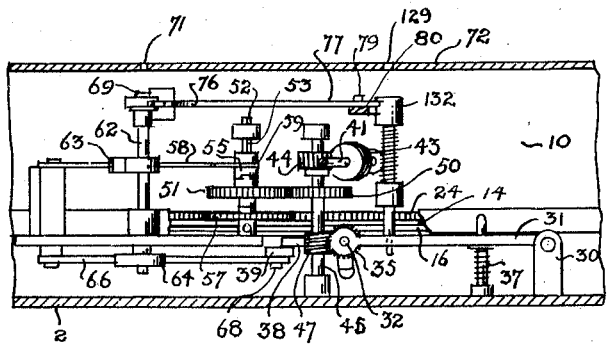
Fig. 4 is a sectional view taken on the line 4—4 of Figure 3.
Figure 5:
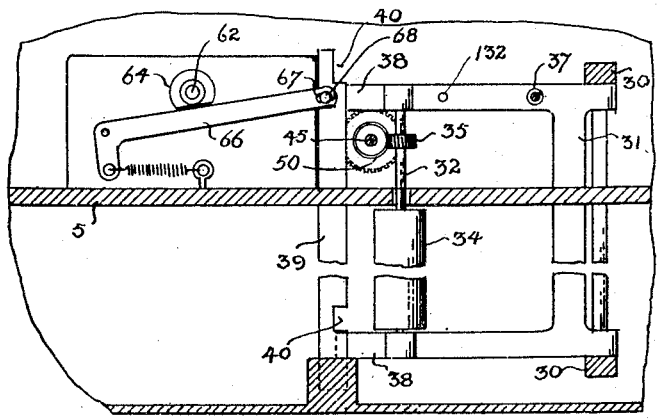
Fig. 5 is a plan view looking up and slowing the roller locking means.

If it is desired to change the weekly sheet 28, the roller is depressed by inserting a suitable key through an aperture 129 adjacent the clock and bearing down on a spring supported plunger 132, see Figures 3, 4 and 5, which engages the forked roller frame 31, the container 16 may then be withdrawn and a new sheet 28 inserted. It will be noted that the container 16 remains stationary when the device is in operation and that the sheet 28 is urged outwardly therefrom by the roller. The friction between the sheet 23 and carbon sheet below it with the sheet 28 is not sufficient to cause the sheet 28 to travel faster than the peripheral speed of the roller 34.

What I claim as my invention is:

1. In a clock operated time recorder having a stylus adapted to mark on two superimposed charts, means for imparting a positive drive to the upper chart, and frictional roller means disposed below the stylus for driving the lower chart, said frictional roller means serving to apply pressure to hold the charts in marking engagement with the stylus and a manually controlled member for simultaneously raising the stylus from the charts and for disconnecting the driving means from the upper chart.

2. In a time recorder having chart moving and record marking means, a marking sheet and record chart container within the recorder, said container comprising a frame having an opening adapted to be covered by the record chart, said frame having means at one end for engaging an end of the chart, means at the other end for engaging the marking sheet, and means within said recorder for feeding the marking sheet in contact with the marking means, and clock operated means for moving the container and the record sheet under the marking means.

3. In a time recorder having a cabinet in which charts are adapted to be moved, a clock mechanism for imparting movement to charts to be marked, a pair of tracks for movably supporting a container, a stylus mounted between said tracks, a record sheet secured to said frame adapted to be marked by the stylus, a spring tensioned roller mounted adjacent the stylus and a carbon sheet connected to said frame and wound upon said roller, said carbon sheet being adapted to normally lie between the stylus and the record sheet and move to expose the marked portion of the record sheet to view, an operating train connecting the clock mechanism to move the container and the record sheet lengthwise of the tracks, a sheet carried by said container for marking a second record sheet, said second marking sheet being carried behind said first named record sheet, means for supporting a second record sheet parallel to the container and a spring pressed driven roller normally bearing against the back of said second record sheet to cause said stylus to mark said second record sheet simultaneously with the marking of said first sheet and to move said second sheet at a different speed to that of the first record sheet container.

WILLIAM HALKO.

REFERENCES CITED

The following references are of record in the file of this patent:

UNITED STATES PATENTS

| Number | Name | Date |
|---|---|---|
| 600,259 | Deubner | Mar. 8, 1898 |
| 624,866 | Riddell | May 9, 1899 |
| 1,249,193 | Quigley | Dec. 4, 1917 |
| 2,291,475 | Kellogg et al. | July 28, 1942 |

FOREIGN PATENTS

| Number | Country | Date |
|---|---|---|
| 11,823 | Great Britain | June 7, 1899 |